(12) United States Patent
Hautson et al.

(10) Patent No.: US 9,436,342 B2
(45) Date of Patent: Sep. 6, 2016

(54) SCREEN WITH MAGNETIC OBJECT LOCATING

(71) Applicant: Commissariat à l'énergie atomique et aux énergies alternatives, Paris (FR)

(72) Inventors: Tristan Hautson, Grenoble (FR); Timothée Jobert, Grenoble (FR); Jean-Luc Vallejo, Grenoble (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 18 days.

(21) Appl. No.: 14/389,097

(22) PCT Filed: Mar. 28, 2013

(86) PCT No.: PCT/EP2013/056809
§ 371 (c)(1),
(2) Date: Sep. 29, 2014

(87) PCT Pub. No.: WO2013/144337
PCT Pub. Date: Oct. 3, 2013

(65) Prior Publication Data
US 2015/0084915 A1    Mar. 26, 2015

(30) Foreign Application Priority Data

Mar. 29, 2012  (FR) ..................................... 12 52879

(51) Int. Cl.
*G06F 3/046* (2006.01)
*G01B 7/004* (2006.01)

(52) U.S. Cl.
CPC ............... *G06F 3/046* (2013.01); *G01B 7/004* (2013.01)

(58) Field of Classification Search
None
See application file for complete search history.

(56) References Cited

U.S. PATENT DOCUMENTS 6,263,230 B1   7/2001   Haynor et al.
6,269,324 B1   7/2001   Rakijas et al.
(Continued)

FOREIGN PATENT DOCUMENTS

CN    101361660   5/2008
FR    2 586 302   2/1987
(Continued)

OTHER PUBLICATIONS

Yabukami, et al. "Motion Capture System of Magnetic Markers Using Three-Axial Magnetic Field Sensor" IEEE Transactions on Magnetics, IEEE Service Center, New York, NY. vol. 36, No. 5 (Nov. 1, 2000) XP011033261, ISSN: 0018-9464.

*Primary Examiner* — Joseph Haley
*Assistant Examiner* — Emily Frank
(74) *Attorney, Agent, or Firm* — Occhiuti & Rohlicek LLP

(57) ABSTRACT

A screen comprising a transparent panel and a photon-generating layer in order to form each luminous pixel visible through the transparent panel, this layer being housed behind the transparent panel. There is a human/machine interface able to control the photon-generating layer in order to modify the display of an image by the screen. The interface includes a localizing device for localizing a movable permanent magnet able to be moved directly by hand by a human being in front of the panel, this device comprising for this purpose. The interface also includes a network of magnetometers comprising N tri-axis magnetometers mechanically connected to one another with no degree of freedom in order to maintain a known distance between each of these magnetometers, where N is a whole number higher than or equal to five. There is an electronic processing unit able to determine the position and/or orientation of the permanent magnet from the measurements of the magnetometers of this network and a unit able to control the photon-generating layer in order to modify the display depending on the position and/or orientation determined by the device for localizing.

8 Claims, 2 Drawing Sheets

(56) References Cited

U.S. PATENT DOCUMENTS

| | | | |
|---|---|---|---|
| 8,928,602 B1* | 1/2015 | Wan | G01R 33/06 178/18.07 |
| 2002/0171427 A1 | 11/2002 | Wiegert et al. | |
| 2005/0162411 A1* | 7/2005 | Berkel van | G06F 3/03545 345/179 |
| 2007/0018076 A1* | 1/2007 | Chen | G06F 3/046 250/208.2 |
| 2009/0184930 A1* | 7/2009 | Li | G06F 3/046 345/173 |

FOREIGN PATENT DOCUMENTS

| | | |
|---|---|---|
| FR | 2 952 450 | 5/2011 |
| WO | 2005/024620 | 3/2005 |

* cited by examiner

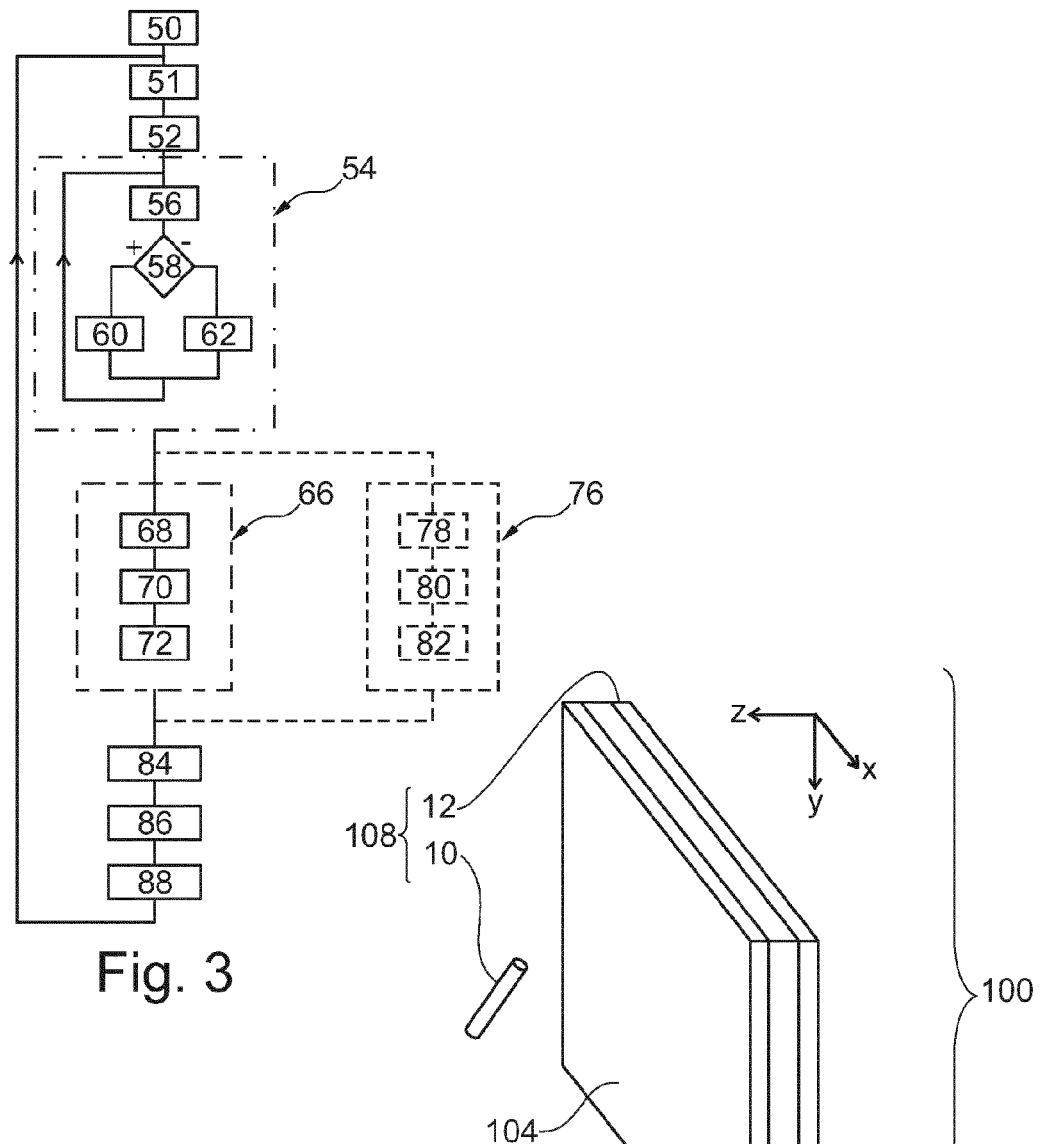
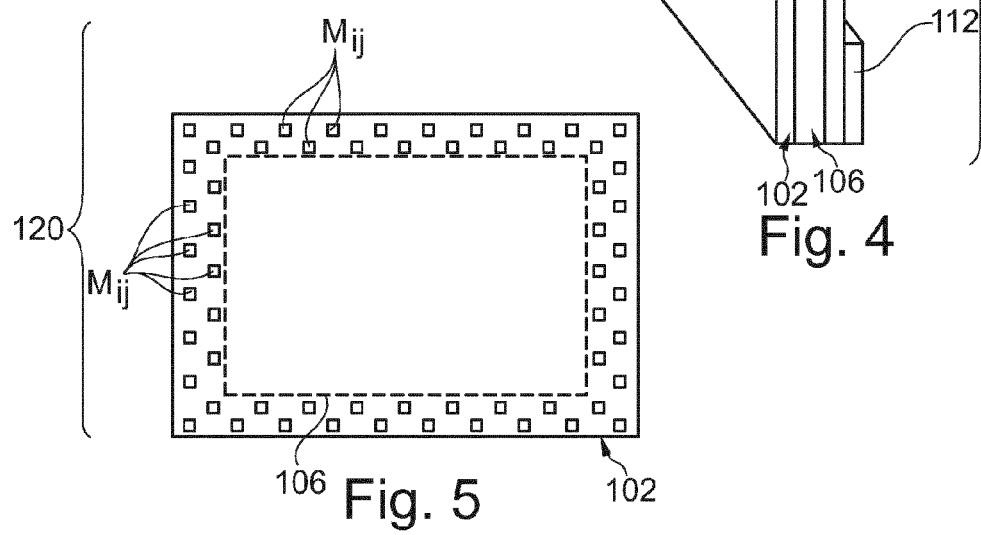

SCREEN WITH MAGNETIC OBJECT LOCATING

RELATED APPLICATIONS

This application is a U.S. National Stage of international application number PCT/EP2013/056809 filed Mar. 28, 2013, which claims the benefit of the priority date of French Patent Application FR 1252879, filed Mar. 29, 2012, the contents of which are herein incorporated by reference.

FIELD OF INVENTION

The invention relates to a screen and to a method for controlling this screen. The invention also relates to a data storage medium for implementing the method.

BACKGROUND

Known screens comprise:
- a transparent panel;
- a photon-generating layer in order to form each luminous pixel visible through the transparent panel, this layer being housed behind the transparent panel; and
- a human/machine interface able to control the photon-generating layer in order to modify the display of an image by the screen.

In many cases, the human/machine interface takes the form of a touchscreen, i.e. a screen that may be controlled by touching it with a finger. This type of interface has the great advantage of being ergonomic and simple to use. However, the contact of the finger on the screen inevitably leads to the screen becoming dirty.

The human/machine interface may also comprise a device for localizing a source of an alternating magnetic field, said source being freely movable by the user. In this case, it is the movement of the source of the alternating magnetic field that allows the display of the screen to be controlled. This type of interface has the advantage that there is no direct contact with the screen so that dirtying of the screen is limited. In contrast, it is necessary to supply the source of the alternating magnetic field with power in order for it to function. This complicates production of this type of interface because it is necessary to provide:
- either an electromagnetically coupled power supply, such as in patent application WO 2005/024620 A2;
- or a battery housed in the source of the alternating magnetic field, such as in patent application FR 2 586 302 A1.

Prior art is also known from CN 10 136 1660 A and FR 2 952 450 A1.

SUMMARY

The invention aims to remedy this problem by providing a screen equipped with an interface that limits dirtying of the screen while remaining simple to produce.

For this purpose, the invention provides a screen according to claim 1.

In the above screen, it is no longer necessary for the user to touch the screen with their finger. Dirtying of the screen is therefore limited. However, this interface remains simple to produce because the user only has to handle a permanent magnet. Thus, problems with supplying power to a source of an alternating magnetic field are avoided. In addition, the experience of using this interface remains similar to the experience of using a touchscreen except that contact with the screen is not necessary. Therefore, this interface has the same advantages as a touchscreen.

The interface proposed above even has additional advantages. For example, the zone of interaction between the user and the screen is larger. In particular, it is not limited to the surface of the screen but extends, in the same plane as the screen, beyond its periphery.

Using a network of magnetometers allows the magnetic object to be localized very precisely.

Embodiments of this screen may comprise one or more of the features of the dependent claims.

These embodiments of the screen furthermore have the following advantages:
- using many magnetometers allows the precision of the localization of the magnetic object in front of the panel to be increased;
- distributing the magnetometers in a strip around the photon-generating layer makes it possible to prevent the localization of the magnetic object from being disrupted by the presence of magnetic material in the photon-generating layer; and
- eliminating magnetometers closest to or furthest from the magnetic object allows the computational power required to localize this object to be decreased.

The invention also relates to an assembly according to claim 7.

The invention also relates to a method for controlling the display of the above screen, according to claim 8.

Embodiments of this control method may comprise one or more of the features of the dependent method claims.

These embodiments of the method furthermore have the following advantage:
- turning off the eliminated magnetometers makes it possible to decrease the electrical power consumption of the network of magnetometers.

The invention also relates to a data storage medium containing instructions for implementing the above control method, when these instructions are executed by an electronic processor.

The invention will be better understood on reading the following description, given merely by way of nonlimiting example and with reference to the drawings.

BRIEF DESCRIPTION OF THE DRAWINGS

FIG. 3 is a flowchart of a method for controlling a screen using the human/machine interface in FIG. 1;

FIG. 4 is a perspective schematic illustration of a screen incorporating a human/machine interface similar to that in FIG. 1; and FIG. 5 is a schematic illustration of a front view of another embodiment of the screen in FIG. 4.

In these figures, the same references are used to designate the same elements.

DETAILED DESCRIPTION

In the rest of this description, features and functions well known to those skilled in the art will not be described in detail.

Figure 1:
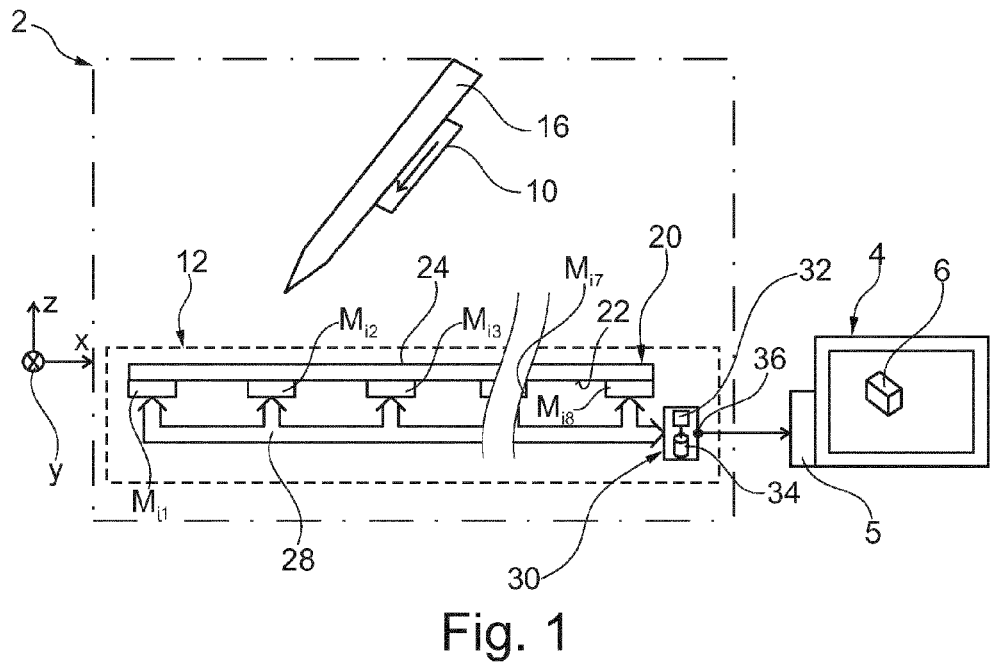
FIG. 1 is a schematic illustration of a human/machine interface allowing a screen to be controlled.

FIG. 1 shows a human/machine interface 2 of a screen 4. Here, the screen 4 is connected to a control unit 5 capable of controlling the display of an image on this screen 4. In order to simplify FIG. 1, the various elements of the screen 4, i.e. the interface 2 and the unit 5, are shown next to each other.

Here, operation of the human/machine interface 2 is illustrated for the case where the unit 5 controls the position and orientation of a cursor 6 on the screen 4. For example, the cursor has a three-dimensional shape. In FIG. 1, the cursor 6 is a parallelepiped. However, the interface 2 may be used to acquire many other commands from the user.

The interface 2 comprises a magnetic object 10 and a device 12 for localizing this object 10. The object 10 is freely movable in an orthogonal coordinate system XYZ fixed with no degree of freedom to the device 12. Here, the directions X and Y are horizontal and the direction Z is vertical.

For example, the object 10 is a permanent magnet having a nonzero magnetic moment even in the absence of an external magnetic field. For example, the coercive magnetic field of this magnet is higher than 100 A.m$^{-1}$ or 500 A.m$^{-1}$. It is for example made of a ferro- or ferrimagnetic material.

The object 10 has an oblong shape. In FIG. 1, the direction of the magnetic moment of the object 10 is indicated by an arrow parallel to the longitudinal direction of this object. The longest length of this object is designated L below. The power of the permanent magnet is typically higher than 0.01 A.m$^2$ or 0.1 A.m$^2$.

In this embodiment, the object 10 is fixed with no degree of freedom to a non-magnetic implement 16. The term "non-magnetic" is understood to mean an implement made of a material having no measurable magnetic properties.

The implement 16 may be localized from the position of the object 10. The implement 16 also makes it possible to make handling the object 10 easier if the latter is small in size. Typically, the combination of the object 10 and of the implement 16 is freely movable directly by hand by a human being in the XYZ coordinate system. For this purpose, this combination weighs less than one kilo, and preferably less than 200 g. This combination is sufficiently small in size to be able to be picked up and moved in one hand of a user. For example, the implement 16 is a wooden or plastic stylus or a ring. In the case of a ring, the latter is intended to be worn on the finger of the user.

The device 12 allows the object 10 to be localized in the coordinate system XYZ. The terms "localized", "localizing", "localize" and "localization" are here understood to mean that the x, y, z position of the object 10 in the XYZ coordinate system and also the orientation of the object 10 relative to the axes X, Y and Z of the XYZ coordinate system are determined. For example, the orientation of the object 10 is represented by the angles $\theta_x$, $\theta_y$ and $\theta_z$ of the magnetic moment of the object 10 relative to the axes X, Y and Z of the coordinate system, respectively.

The device 12 comprises a network of N tri-axis magnetometers $M_{ij}$. In FIG. 1, the vertical wavy lines indicate that a portion of the device 12 has not been shown.

A tri-axis magnetometer is a magnetometer able to measure the projection of the magnetic field on three non-collinear measuring axes. Such a magnetometer measures the direction of the magnetic field. In addition, generally, this magnetometer also measures the amplitude or the norm of the magnetic field.

Typically, N is higher than five and, preferably, higher than sixteen or thirty-two. Here, N is higher than or equal to sixty-four.

In this embodiment, the magnetometers $M_{ij}$ are aligned in rows and columns in order to form a matrix. Here, this matrix comprises eight rows and eight columns. The indices i and j identify the row and column, respectively, of this matrix at the intersection of which the magnetometer $M_{ij}$ is located. In FIG. 1, only the magnetometers $M_{i1}$, $M_{i2}$, $M_{i3}$, $M_{i7}$, and $M_{i8}$ of one row i are shown. The position of the magnetometers $M_{ij}$ relative to one another is described in greater detail with reference to FIG. 2.

Each magnetometer $M_{ij}$ is stationary with no degree of freedom relative to the other magnetometers. For this purpose, the magnetometers $M_{ij}$ are fixed with no degree of freedom to a back face 22 of a rigid sheet 20. This rigid sheet has a front face 24 that is turned toward the object 10. The sheet 20 is made of a rigid non-magnetic material. For example, the sheet 20 is made of glass and forms the panel of the screen 4.

Each magnetometer $M_{ij}$ measures the direction and magnitude of the magnetic field generated by the object 10. To do this, each magnetometer $M_{ij}$ measures the norm of the orthogonal projection of the magnetic field generated by the object 10 in this magnetometer $M_{ij}$ on three measuring axes of this magnetometer. Here, these three measuring axes are orthogonal to one another. For example, the measuring axes of each of the magnetometers $M_{ij}$ are parallel to the axes X, Y and Z of the coordinate system, respectively. The sensitivity of the magnetometer $M_{ij}$ is for example 4×10$^{-7}$ T.

Each magnetometer $M_{ij}$ is connected by way of a data transmission bus 28 to a processing unit 30.

The processing unit 30 is capable of determining the position and orientation of the object 10 in the XYZ coordinate system from the measurements of the magnetometers $M_{ij}$. For this purpose, the unit 30 comprises a programmable electronic processor 32 that is able to execute instructions stored on a data storage medium. The unit 30 therefore also comprises a memory 34 containing the instructions required to execute with the processor 32 the method shown in FIG. 3. In particular, the unit 30 implements a mathematical model associating each measurement of a magnetometer $M_{ij}$ with the position, orientation and amplitude of a magnetic dipole corresponding to the object 10 in the XYZ coordinate system. This model therefore takes the form of a system of equations in which the position, orientation and amplitude of the magnetic dipole are unknowns and the measurements of the magnetometers $M_{ij}$ and their positions are knowns. For example, this system of equations is solved using an extended Kalman filter. This model is typically constructed from equations describing the physics of electromagnetism. In order to construct this model, the object 10 is approximated by a magnetic dipole. This approximation introduces very few errors if the distance between the object 10 and the magnetometer $M_{ij}$ is larger than 2L and, preferably, larger than 3L, where L is the largest dimension of the object 10. Typically, L is smaller than 20 cm and, preferably, smaller than 10 or 5 cm.

The unit 30 is also capable of delivering the position and orientation measured for the object 10 to an interface 36.

The control unit 5 is connected to the unit 30 by way of this interface 36.

Figure 2:
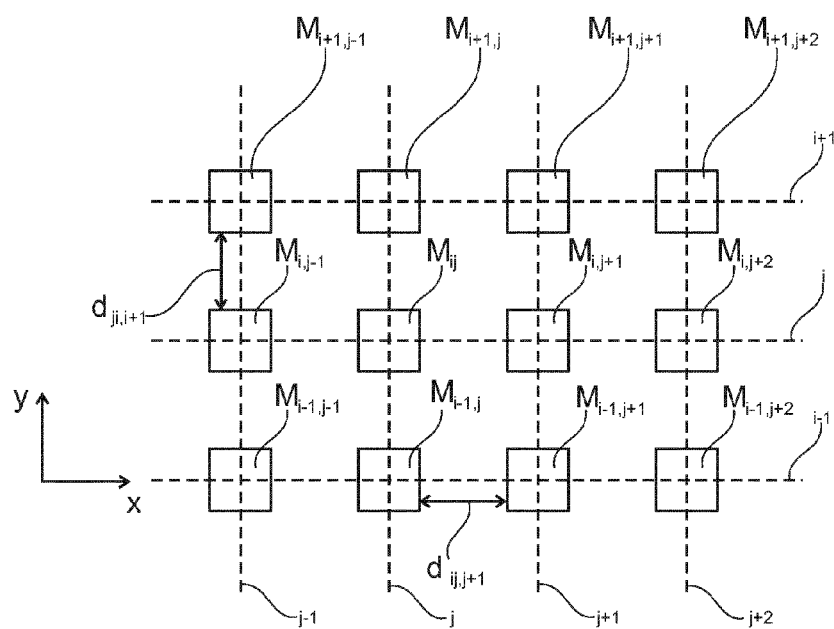
FIG. 2 is a partial illustration of a network of magnetometers employed in the human/machine interface in FIG. 1, as seen from above.

FIG. 2 shows some of the magnetometers $M_{ij}$ of the device 12. These magnetometers $M_{ij}$ are aligned in rows i parallel to the direction X. These magnetometers are also aligned in columns j parallel to the direction Y, in order to form a matrix. The rows i and the columns j are arranged in order of increasing indices.

The center of the magnetometer $M_{ij}$ is located at the intersection of the row i and of the column j. The center of the magnetometer corresponds to the point where the magnetic field is measured by this magnetometer. Here, the indices i and j are contained in the interval [1; 8].

The centers of two magnetometers $M_{ij}$ and $M_{i,j+1}$ immediately consecutive along a row i are separated by a known distance $d_{i,j,j+1}$. Similarly, the centers of two magnetometers $M_{ij}$ and $M_{i+1,j}$ immediately consecutive along a given column j are separated by a known distance $d_{j,i,i+1}$.

In the particular case described here, whatever the row i, the distance $d_{i,j,j+1}$ is the same. This distance is therefore designated $d_j$. Similarly, whatever the column j, the distance $d_{j,i,i+1}$ between two magnetometers is the same. This distance is therefore designated $d_i$.

Here, the distances $d_i$ and $d_j$ are both equal to d.

Typically, the distance d is comprised between 1 and 4 cm when:
the power of the permanent magnet is 0.5 A.m$^2$;
the sensitivity of the magnetometers is $4\times10^{-7}$ T; and
the magnetometers $M_{ij}$ are sixty-four in number.

Operation of the screen 4 and its interface 2 will now be described with reference to the method in FIG. 3.

Initially, in a step 50, the extended Kalman filter is initialized under the assumption that the object 10 is at the center of the network of magnetometers and taking any set orientation for this object 10. For example, the object 10 is initially considered to be horizontal.

Next, the following steps are reiterated in order to carry out each localization of the object 10 in front of the screen 4. The various localizations of the object 10 allow its movement to be tracked.

In a step 51, magnetometers saturated by the magnetic field of the object 10 are eliminated. A saturated magnetometer is a magnetometer the measurement of which no longer varies if the object 10 is moved closer to this magnetometer. When a magnetometer is saturated, it delivers a signal with a known measurement characteristic that is different from those liable to be delivered when it is not saturated. Thus, in step 51, the processor 32 identifies saturated magnetometers from the measurement signal delivered by each magnetometer. The magnetometers identified as being "saturated" are marked as being eliminated. For example, for this purpose an identifier of this magnetometer is added to a list of eliminated magnetometers. In this description, a magnetometer identified as being eliminated is said to be "eliminated".

In a step 52, the position of the object 10 is estimated. Here, this estimation consists in taking the previously determined position.

Next, in a step 54, the magnetometers $M_{ij}$ closest to the estimated position are identified.

In this embodiment, in step 54, a magnetometer $M_{ij}$ is considered to be one of the magnetometers closest to the estimated position if the distance $e_{ij}$ that separates it from the estimated position is smaller than a preset threshold $S_b$. The value of the threshold $S_b$ is higher than or equal to 2L and, preferably, higher than or equal to 3L. In addition, the value of this threshold is chosen to be sufficiently small that, whatever the position of the object 10 relative to the device 12, all of the magnetometers $M_{ij}$ are never contained in a sphere of radius $S_b$ centered on the object 10. For example, preferably, the value of the threshold $S_b$ is chosen to be lower than half the distance between the two magnetometers $M_{ij}$ that are furthest away from each other in the network. For example, here, the value of the threshold $S_b$ is chosen to be equal to 3L.

In an operation 56, for each magnetometer $M_{ij}$, the distance $e_{ij}$ between this magnetometer and the estimated position is calculated.

Next, in an operation 58, the calculated distance $e_{ij}$ is compared to the threshold $S_b$. If the distance $e_{ij}$ is smaller than the threshold $S_b$, then, in an operation 60, this magnetometer $S_{ij}$ is identified as being one of the magnetometers closest to the estimated position. This magnetometer is then eliminated.

If the distance $e_{ij}$ is larger than the threshold $S_b$, the magnetometer $M_{ij}$ is not identified and is thus not eliminated.

The operations 56 to 62 are reiterated for each magnetometer $M_{ij}$.

After step 54, all the magnetometers the distance $e_{ij}$ of which is smaller than the threshold $S_b$ have been eliminated.

Next, in a step 66, the processor 32 identifies the magnetometers $M_{ij}$ that are furthest from the estimated position of the object 10. The furthest magnetometers are the magnetometers, chosen only from magnetometers that have not already previously been eliminated, that do not belong to the group of the $N_p$ magnetometers closest to the estimated position, where $N_p$ is a preset integer strictly lower than N. Preferably, $N_p$ is higher than ten or twenty.

This step 66 therefore consists in selecting only the magnetometers closest to the estimated position from those that have not already been eliminated. To do this, in an operation 68, the magnetometers $M_{ij}$ that have not already been eliminated are classed in increasing or decreasing order as a function of their distance $e_{ij}$. In the operation 68, the distances $e_{ij}$ calculated for the various magnetometers are compared to one another.

Next, in an operation 70, the processor selects the $N_p$ magnetometers associated with the smallest distances $e_{ij}$. In this way, the processor selects only the $N_p$ magnetometers closest to the estimated position.

In an operation 72, magnetometers not selected in operation 70 are eliminated.

Optionally, in parallel or instead of step 70, in a step 76 the magnetometers $M_{ij}$ that do not belong to the group of the $N_n$ magnetometers measuring the magnetic field of largest norm are eliminated, where $N_n$ is an integer higher than ten or twenty and strictly lower than N.

To do this, in an operation 78, the magnetometers $M_{ij}$ that have still not been eliminated are classed in increasing or decreasing order of the norm of the magnetic field measured by these magnetometers.

Next, in an operation 80, the processor 32 selects the first $N_n$ magnetometers in this list of magnetometers classed in decreasing order of the norm of the measured magnetic field. Therefore, in this way, the processor 32 selects the $N_n$ not yet eliminated magnetometers measuring the largest signal.

In an operation 82, the magnetometers not selected in operation 80 are eliminated.

Next, in a step 84, the magnetic field of the object 10 is measured using only magnetometers not eliminated in the preceding steps. Preferably, in the step 84, eliminated magnetometers are turned off in order to save power.

In a step 86, the processor 32 determines the position and orientation of the object 10 using only the measurements of the non-eliminated magnetometers. For example, it removes from the system of equations containing measurements originating from the eliminated magnetometers. Next, it implements this Kalman filter in order to find the new position and orientation of the object 10. After step 86, the processor 32 delivers to the interface 36 the position and orientation determined for the object 10.

In a step 88, the unit 5 controls the display of the cursor 6 on the screen 4 depending on the position and orientation determined in step 86. To do this, the unit 5 controls a photon-generating layer, which is described in greater detail with reference to FIG. 4. After step 88, the method returns to step 51.

Limiting the number of measurements used in step 86 allows the computational power required to localize the object 10 to be limited. This limitation of computational power may then be exploited, for example, to increase the precision of the localization by processing more measurements in the same lapse of time or to increase computational speed and therefore localize the object 10 more rapidly. In addition, this limitation of the number of measurements does not decrease the precision of the localization since only potentially erroneous measurements, i.e. those of magnetometers closest to the estimated position or measurements corresponding to the weakest signals, are eliminated.

FIG. 4 shows a screen 100 such as a television screen. This screen 100 comprises a panel 102 made of a material that is transparent to visible light. The panel 102 is for example made of glass. This panel has a front face 104 that is turned toward the viewer and a back face. Here, the front face is perpendicular to the direction Z, which is directed toward the viewer. In the rest of this description, the front and back of the screen 100 are defined relative to this Z direction.

The screen 100 also comprises a photon-generating layer 106 for forming each pixel on the panel 102. This layer 106 is placed immediately behind the panel 102. It is possible to use various technologies to produce this layer 106. Preferably, the technology selected consists of a layer not containing a metal grid. Typically, the layer 106 is made up of organic light-emitting diodes (OLEDs).

Lastly, the screen 100 comprises a human/machine interface 108. This interface is identical to the interface 2 except that the magnetic object 10 is here not attached to an implement. The object 10 is located on the same side as the front face 104 during use of this interface 108.

In this embodiment, the localizing device 12 for its part is placed behind the layer 106. The rows i and columns j of the network of magnetometers extend parallel to the face 104. Preferably, the length of the diagonal between the magnetometers that are furthest away from each other in the network is equal to the diagonal of the front face 104 to within plus or minus 15% or 5%.

A control unit 112 is connected to the interface 36 of the device 12. This unit 112 is able to control the layer 106 in order to modify the display depending on the position and/or orientation acquired by the human/machine interface 108. For example, the unit 112 changes the television channel, fast forwards or rewinds the program being watched or enlarges the image depending on the position and orientation acquired by the interface 108. Typically, the unit 112 is capable of carrying out commands conventionally associated with a screen, but here these commands are transmitted by moving the object 10.

It will be noted that in the case described here, the zone of interaction with the screen extends beyond, in the directions X and Y, the front face 104. This is because the position of the object 10 is measurable even if the latter is placed to the left or to the right of the screen in the X or Y directions.

FIG. 5 shows a screen 120 that is identical to the screen 100 except that the magnetometers of the localizing device 12 are not all placed behind the photon-generating layer 106. Here, the magnetometers $M_{ij}$ are essentially placed around the layer 106. In this case, these magnetometers $M_{ij}$ define a strip of magnetometers that encircles a zone that is free of magnetometers or that contains a lower density of magnetometers. This strip of magnetometers is fixed directly to the panel 102. In FIG. 5, the periphery of the layer 106 is represented by a dashed line.

Many other embodiments are possible. The screen described here may have many applications. For example, the screen may be used as an apparatus for acquiring a hand-written text or a hand-drawn drawing. In this case, the object 10 is fixed with no degree of freedom to a stylus. The control unit 5 comprises a module for localizing the tip of the stylus relative to the sheet 20 and for memorizing each position of the tip when the latter is in contact with the sheet 20. Under these conditions, the unit 5 allows a file to be created containing the path followed by the tip of the stylus over the upper face 24. At the same time, the unit 5 displays on the screen the path followed by the tip.

The human/machine interface may be used to control functions of a screen other than simply the position and orientation of a cursor. For example, the human/machine interface may be used to trigger an enlargement of an image when the magnetic object is moved closer to the sheet 20 and, inversely, a contraction of the image when the magnetic object is moved further away from the sheet 20.

If the area of the network of magnetometers is sufficiently large, the appliance 2 may comprise simultaneously a plurality of magnetic objects 10. In this case, the method described above is applied, in parallel, to each of these magnetic objects. The list of eliminated magnetometers is then specific to each magnetic object.

The processing unit 30 may be physically incorporated inside the controlled appliance instead of being incorporated inside the human/machine interface.

As a variant, the control unit selects the algorithm used in step 86 to determine the position and/or orientation of the object 10 depending on the position estimated in step 52. For example, if the object 10 is very close to the network of magnetometers and its magnetic moment is vertical, the model relating the measurements of the magnetometers to the position and orientation of the object 10 is modified. In this case, the modification consists for example in setting the value of the magnetic moment of the object 10 along the Z axis.

Other variants of the algorithm for determining the position and/or orientation of the object 10 are possible. For example, the method described in U.S. Pat. No. 6,269,324 is usable. These methods do not necessarily use a Kalman filter. For example, the methods described in US 2002/171427 A1 or U.S. Pat. No. 6,263,230 B1 may possibly be used. As another variant, the measurements of the magnetometers are first used to construct a magnetic fingerprint of the object 10. The constructed fingerprint is then compared to a database of preset magnetic fingerprints of known objects. This database associates with each known object complementary data such as, for example, the value of its magnetic moment. If the constructed fingerprint corresponds to one of those in the database, the complementary data associated with this known object are then used to improve or simplify the localization of this object in step 86.

The approximation used to construct the system of equations may also be a quaternary or higher-order approximation, i.e. the electromagnetism equations are approximated to a higher order than that corresponding to the bipolar approximation.

The magnetometers of the network of magnetometers are not necessarily arranged in columns and rows. They may also be arranged in other patterns. For example, the magnetometers are placed on each corner of each triangular or hexagonal cell of a meshed plane.

The arrangement of the magnetometers relative to one another may also be random or irregular. Thus, the distance between two immediately consecutive magnetometers in the network is not necessarily the same for all the pairs of two immediately consecutive magnetometers. For example, the density of magnetometers in a given zone of the network may be higher than elsewhere. Increasing the density in a given zone may allow the precision of the measurement in this zone to be increased. It is also possible to provide zones of higher density on the periphery of the network in order to limit edge effects. For example, the network of magnetometers may comprise a central zone free from magnetometers. In this case, the magnetometers are only distributed around the periphery of this central zone and form a strip of magnetometers that encircles and bounds the central zone. Typically, the width of this strip is strictly smaller than the width of the central zone measured in the same direction.

As a variant, the network of magnetometers extends only in a single direction. The magnetometers are then placed one after the other in one and the same single row.

In contrast, the network of magnetometers may also extend in three non-collinear directions in space. Under these conditions, the magnetometers are distributed inside a three-dimensional volume.

The number N of magnetometers may also be higher than or equal to sixty-four or ninety.

All the magnetometers of the network of magnetometers are not necessarily identical to one another. As a variant, the magnetometers do not all have the same sensitivity. In this case, the less precise magnetometers are for example placed near the center of the network whereas the more precise magnetometers are placed on the periphery of this network. Such an embodiment has the advantage of placing the most difficultly saturatable, and therefore the least sensitive, magnetometers in locations liable to be closest to the magnetic object. This also makes it possible to increase the size of the zone of interaction.

As a variant, the elimination of the magnetometers closest to and/or furthest from the estimated position or measuring the lowest magnetic field norm may be omitted.

The elimination of saturated magnetometers may also be carried out at different instants. For example, it may be carried out after step 54, 66 or 76. The elimination of saturated magnetometers may also be omitted.

Step 51 of eliminating saturated magnetometers may also be implemented without the other steps of eliminating magnetometers.

In another variant, only the position or only the orientation of the magnetic object is determined.

The various processing operations described here may also be carried out in post-processing, i.e. first all the measured data are stored in a memory, then the measurements of certain magnetometers are subsequently eliminated during processing of the stored data.

In another embodiment, the position of the magnetic object is estimated in step 52 from a measurement of another sensor separate from those belonging to the network of magnetometers. This other sensor is preferably insensitive to the magnetic field. For example, it may be a video camera associated with a shape recognition module for estimating the position of the object relative to the network of magnetometers.

The screen described here may be used in many different applications such as for example in computers, cell phones, tablet computers, interactive whiteboards, etc.

The invention claimed is:

1. A screen comprising:
a transparent panel;
a photon-generating layer in order to form each luminous pixel visible through the transparent panel, the photon-generating layer being housed behind the transparent panel; and
a human/machine interface able to control the photon-generating layer in order to modify the display of an image by the screen, wherein the interface comprises:
a localizing device for localizing a movable permanent magnet able to be moved directly by hand by a human being in front of the panel, the localizing device comprising for this purpose:
a network of magnetometers comprising N tri-axis magnetometers mechanically connected to one another with no degree of freedom in order to maintain a known distance between each of these magnetometers, where N is a whole number higher than or equal to five; and
an electronic processing unit able to determine the position and/or orientation of the permanent magnet from the measurements of the magnetometers of this network; and
a unit able to control the photon-generating layer in order to modify the display depending on the position and/or orientation determined by the device for localizing; and
wherein the magnetometers of the network of magnetometers are arranged inside a strip that encircles the external periphery of the photon generating layer and none of the magnetometers of the network of magnetometers is placed in front of or behind the photon-generating layer in a direction perpendicular to the layer.

2. The screen as claimed in claim 1, in which the number N is higher than or equal to sixteen.

3. The screen as claimed in claim 1, in which the magnetometers are placed in a given plane and distributed in this plane so as to form a plurality of columns of magnetometers that are parallel to one another.

4. An assembly, comprising:
a screen according to claim 1; and
a movable permanent magnet able to be localized by the localizing device.

5. A method for controlling the display of a screen equipped with a transparent panel and with a photon-generating layer in order to form each luminous pixel visible through the transparent panel, the photon-generating layer being housed behind the transparent panel, wherein the method comprises:
a human being moving a movable permanent magnet directly by hand in front of the panel;
measuring the magnetic field generated or modified by the permanent magnet with a plurality of magnetometers of a network of magnetometers comprising N tri-axis magnetometers mechanically connected to one another with no degree of freedom in order to maintain a known distance between each of these magnetometers, where N is a whole number higher than or equal to five;
determining, with an electronic processing unit, the position and/or the orientation of the permanent magnet from the measurements of the magnetometers of this network; and
controlling the photon-generating layer in order to modify the display depending on the position and/or orientation determined by the electronic unit and Wherein the step of determining includes:
a) estimating the position of the permanent magnet relative to the network of magnetometers;
b) calculating the distance between each magnetometer and the estimated position of the permanent magnet; then
c) eliminating the $N_i$ magnetometers closest to or the $N_e$ magnetometers furthest from this estimated position, where $N_i+N_e$ is a positive whole number strictly lower than N;
d) measuring the magnetic field generated or modified by the permanent magnet with each non-eliminated magnetometer; and
e) determining the position and/or orientation of the permanent magnet from the measurements alone of the magnetometers that have not been eliminated.

6. The method as claimed in claim 5, in which in the measuring step, the eliminated magnetometers are turned off.

7. A non-transitory data storage medium, containing program instructions for implementing a control method according to claim 5 when said instructions are executed by an electronic processor.

8. A screen comprising:
a transparent panel;
a photon-generating layer in order to form each luminous pixel visible through the transparent panel, the photon-generating layer being housed behind the transparent panel; and
a human/machine interface able to control the photon-generating layer in order to modify the display of an image by the screen, wherein the interface comprises:
a localizing device for localizing a movable permanent magnet able to be moved directly by hand by a human being in front of the panel, the localizing device comprising for this purpose:

a network of magnetometers comprising N tri-axis magnetometers mechanically connected to one another with no degree of freedom in order to maintain a known distance between each of these magnetometers, where N is a whole number higher than or equal to five; and an electronic processing unit able to determine the position and/or orientation of the permanent magnet from the measurements of the magnetometers of this network; and a unit able to control the photon-generating layer in order to modify the display depending on the position and/or orientation determined by the device for localizing; and wherein the electronic unit includes a non-transitory computer-readable medium containing program instructions programmed to:

a) estimate the position of the permanent magnet relative to the network of magnetometers;

b) calculate the distance between each magnetometer and the estimated position of the permanent magnet; then c) eliminate the $N_i$ magnetometers closest to or the $N_e$ magnetometers furthest from this estimated position, where $N_i+N_e$ is a positive whole number strictly lower than N;

d) acquire the measurement of the magnetic field generated or modified by the permanent magnet taken by each non-eliminated magnetometer; and e) determine the position or orientation of the permanent magnet from the measurements alone of the non-eliminated magnetometers.

* * * * *